(12) United States Patent
Brunner et al.

(10) Patent No.: US 10,330,550 B2
(45) Date of Patent: Jun. 25, 2019

(54) PIEZOELECTRIC PRESSURE SENSOR

(71) Applicant: KISTLER HOLDING AG, Winterthur (CH)

(72) Inventors: Simon Brunner, Effretikon (CH); Markus Haefner, Zurich (CH)

(73) Assignee: Kistler Holding AG, Winterthur (CH)

( * ) Notice: Subject to any disclaimer, the term of this patent is extended or adjusted under 35 U.S.C. 154(b) by 136 days.

(21) Appl. No.: 15/351,685

(22) Filed: Nov. 15, 2016

(65) Prior Publication Data

US 2017/0160153 A1    Jun. 8, 2017

(30) Foreign Application Priority Data

Dec. 3, 2015    (EP) ..................................... 15197864

(51) Int. Cl.
*G01L 9/00*    (2006.01)
*G01L 19/00*    (2006.01)

(52) U.S. Cl.
CPC ............ *G01L 9/008* (2013.01); *G01L 9/0042* (2013.01); *G01L 19/0084* (2013.01)

(58) Field of Classification Search
CPC ... G01L 9/008; G01L 19/0084; G01L 19/143; G01L 9/0042
See application file for complete search history.

(56) References Cited

U.S. PATENT DOCUMENTS

| | | | |
|---|---|---|---|
| 6,536,286 B1 | 3/2003 | Moyer et al. | |
| 6,715,357 B2* | 4/2004 | Ishiguro | G01L 19/0084 73/715 |
| 7,603,906 B2* | 10/2009 | Kroger | G01L 9/008 73/714 |
| 8,113,058 B2* | 2/2012 | Baumgartner | G01L 9/008 361/283.1 |
| 2004/0007075 A1 | 1/2004 | Ishiguro et al. | |
| 2007/0277618 A1 | 12/2007 | Kroeger et al. | |
| 2010/0058875 A1 | 3/2010 | Baumgartner et al. | |
| 2015/0325777 A1* | 11/2015 | Irie | B41J 2/14274 347/50 |

FOREIGN PATENT DOCUMENTS

| | | |
|---|---|---|
| CH | 392103 | 4/1963 |
| DE | 10 2007 024 445 | 12/2007 |
| DE | 10 2009 039 827 | 4/2010 |
| GB | 1054081 | 1/1967 |
| WO | WO 20140406048 | 3/2014 |

OTHER PUBLICATIONS

EP Search Report (15197864), dated May 30, 2016.

* cited by examiner

*Primary Examiner* — Freddie Kirkland, III
(74) *Attorney, Agent, or Firm* — Dority & Manning, P.A.

(57) ABSTRACT

A piezoelectric pressure sensor includes a membrane for capturing a force; a piezoelectric transducer having a front face onto which the force is applied from the membrane and generates electric polarization charges; and an electrode that receives generated electric polarization charges and transmits them via a charge transmission. The electrode includes a charge pick-off and at least one electrode strip. The charge pick-off is arranged parallel to the front face of the piezoelectric transducer. Material bonding in certain areas of the electrode strip connects the charge transmission to the electrode strip.

7 Claims, 9 Drawing Sheets

PIEZOELECTRIC PRESSURE SENSOR

CROSS-REFERENCE TO RELATED APPLICATIONS

This application claims priority to EP Application No. 15197864.0, filed Dec. 3, 2015, which is hereby incorporated herein in its entirety for all purposes by this reference.

FIELD OF THE INVENTION

The invention relates to a piezoelectric pressure sensor and to a process of manufacturing said pressure sensor.

BACKGROUND

Piezoelectric transducers are widely used in sensors for the detection of pressures, forces, accelerations, elongations, moments, etc. Thus, piezoelectric pressure sensors are used in pressure indexing of internal combustion engines for detecting a cylinder pressure prevailing in a pressure chamber as a function of a crankshaft position or a time. Internal combustion engines include four-stroke engines and two-stroke engines such as gasoline engines, diesel engines, Wankel engines, etc. In marine diesel engines, they are used for long-term monitoring of a cylinder pressure. However, piezoelectric pressure sensors can also be used in pressure monitoring of jet engines, gas turbines, steam turbines, steam engines, etc.

Frequently piezoelectric crystal material is used for the manufacture of a piezoelectric transducer. The piezoelectric crystal material is cut in a crystallographic orientation to have a high sensitivity for the force to be received. When a force acts onto surfaces of the piezoelectric crystal material, electric polarization charges are generated thereon. The number of the electric polarization charges correlates with the magnitude of the force applied.

The document CH392103A1 demonstrates a piezoelectric pressure sensor having a membrane that is welded with an edge portion to one end of a housing. Membrane and housing serve to protect the piezoelectric transducer from excessive and extreme temperatures during use. The piezoelectric transducer is mounted within the housing behind the membrane. A force received by the membrane acts in a longitudinal direction of the piezoelectric pressure sensor onto the piezoelectric transducer which comprises three bars made of piezoelectric crystal material as well as electrodes in the form of a contact spring and a Bourdon tube. The electrodes are made of electrically conductive material. The contact spring is arranged along a longitudinal axis of the piezoelectric transducer in the center between the bars arranged in an angle of 120° to one another. The Bourdon tube is placed outwardly of the bars with respect to the longitudinal axis. A normal force acting on front faces of the bars generates electrical polarization charges on the side surfaces located transversely to said front faces which electrical polarization charges are transmitted as negative electric charges by the contact spring and as positive electric charges by the Bourdon tube. The Bourdon tube is electrically and mechanically connected to the housing and conducts the positive electric charges to the housing. The contact spring is formed integrally with the charge transmission wherein the charge transmission extends centrally along the longitudinal direction away from the membrane. The charge transmission is electrically and mechanically connected to a socket. The socket is disposed at an end of the housing that faces away from the membrane and accommodates a plug of a line. The socket is electrically insulated from the housing. Thus, negative electrical charges received by the contact spring are fed via the charge transmission to the socket and from the socket to the line. The line itself is electrically and mechanically connected to an evaluation unit where the negative electric charges are amplified and evaluated. Furthermore, the Bourdon spring mechanically pretensions the bars made of piezoelectric crystal material so that tensile and compressive forces can be measured.

In fact, with continuous use the piezoelectric pressure sensor is exposed to strong engine vibrations and high temperatures of 200° C. and above. These may lead to micro friction and fretting corrosion at the contact areas of the side surfaces of the bars being in contact with the contact spring and the Bourdon tube which may lead to weakening of the mechanical stability of the charge transmission. Furthermore, diffusion of base metals and local build-up of oxide layers on the side surfaces of the bars contacting the contact spring and the Bourdon tube may take place at high temperatures. These effects may occur alone or in combination. As a result, the electrical resistance during charge transmission may change. Thus, the electrical contact resistance may increase from the mΩ range by several orders of magnitude into the MΩ range leading to a distortion of charge transmission and to incorrect evaluation in the evaluation unit.

It is a first object of the present invention to suggest a piezoelectric pressure sensor having a charge transmission essentially free from distortion. Another object of the present invention is to provide a pressure sensor wherein the charge transmission is mechanically stable even with strong permanent engine vibrations. Additionally, the manufacture of the pressure sensor shah be cost-effective.

BRIEF SUMMARY OF THE INVENTION

At least one of these objects is achieved by the features described more fully below.

The invention relates to a piezoelectric pressure sensor having a membrane for capturing a force; a piezoelectric transducer on which the captured force generates electric polarization charges; comprising an electrode that receives generated electric polarization charges and transmits them via a charge transmission; wherein said electrode comprises a charge pick-off and at least one electrode strip; wherein said charge pick-off is arranged parallel to a front face onto which the force is applied of the piezoelectric transducer; and wherein the electrode strip is connected to the charge transmission by means of material bonding in certain areas.

Unlike in the state of the art according to the document CH392103A1, the piezoelectric transducer is not arranged around a central contact spring. According to the invention, charge transmission is achieved from the front face at the piezoelectric material. In this way, the electrode and piezoelectric material remain permanently in contact to each other over their entire surfaces under the action of the force to be measured and due to the mechanical pretension, and even in the case of strong engine vibrations there will be no increase in electric contact resistance and no distortion of the charge transmission.

The invention also relates to a process of manufacturing such a pressure sensor wherein an anti-strain sleeve is positioned over the piezoelectric transducer along a longitudinal axis and the electrode strip protrudes in an angle to the longitudinal axis through an electrode opening of the anti-strain sleeve.

While in the prior art according to the document CH392103A1 the piezoelectric transducer is arranged with side surfaces around a central contact spring serving as charge pick-off and charge transmission, the charge transmission according to the invention is performed parallel to a front face of the piezoelectric transducer. Furthermore, the electrode comprises an electrode strip according to the invention that is connected to a charge transmission by material bonding. The electrode strip protrudes through an electrode opening of an anti-strain sleeve in an angle to the longitudinal axis. This has the advantage that a contact surface at an outer end of the electrode strip is accessible from outside the anti-strain sleeve whereby the pressure sensor can be manufactured in a time-saving and essentially failure-free and, thus, cost-effective manner.

BRIEF DESCRIPTION OF THE DRAWINGS

In the following, the invention will be explained in more detail by way of an illustrative embodiment thereof referring to the Figures in which.

DESCRIPTION OF EXEMPLARY EMBODIMENTS OF THE INVENTION

Figure 1:
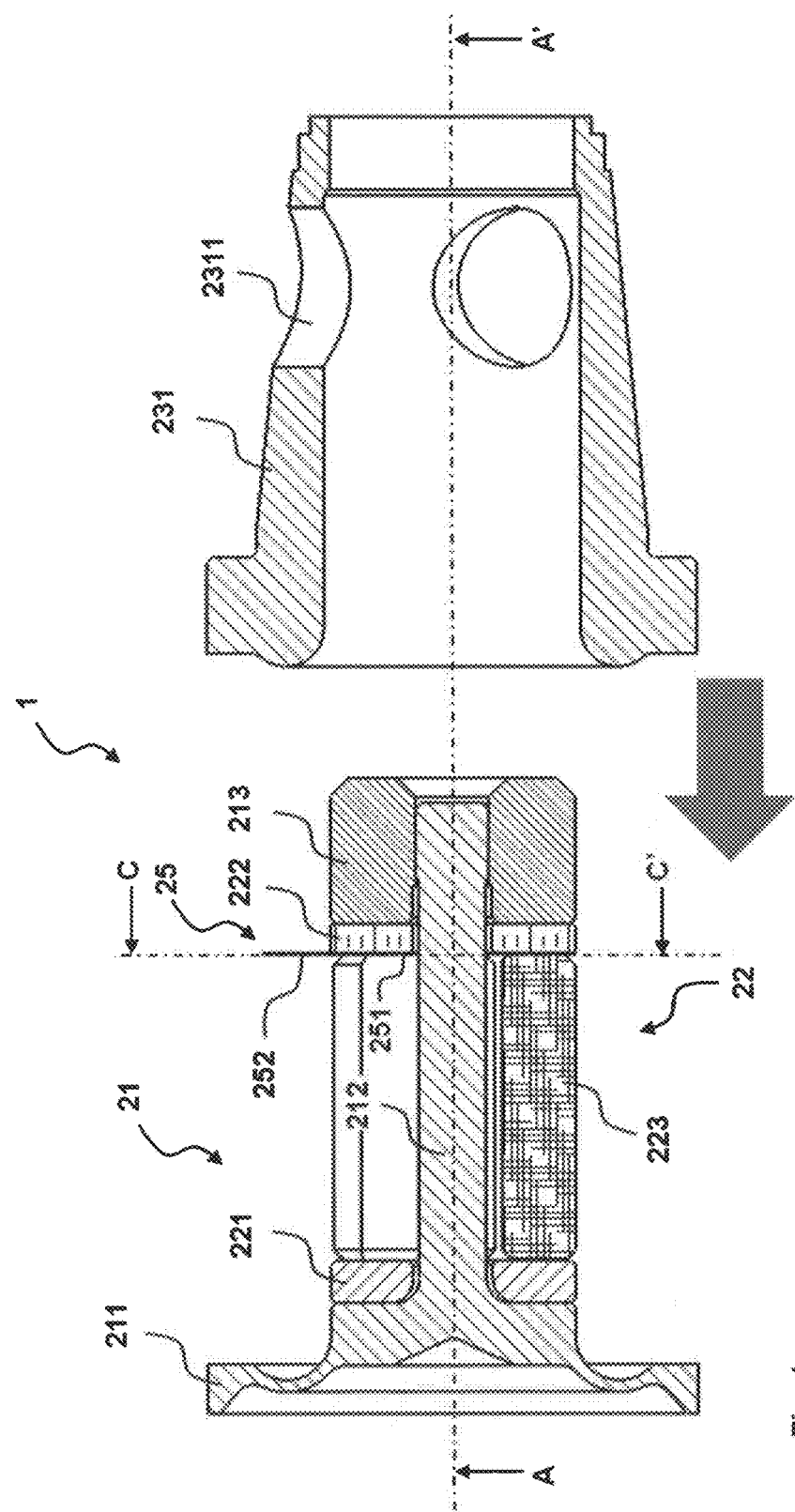
FIG. 1 shows a longitudinal section through a portion of a transducer arrangement of a pressure sensor prior to mechanical connection to a membrane and an anti-strain sleeve.
Figure 2:
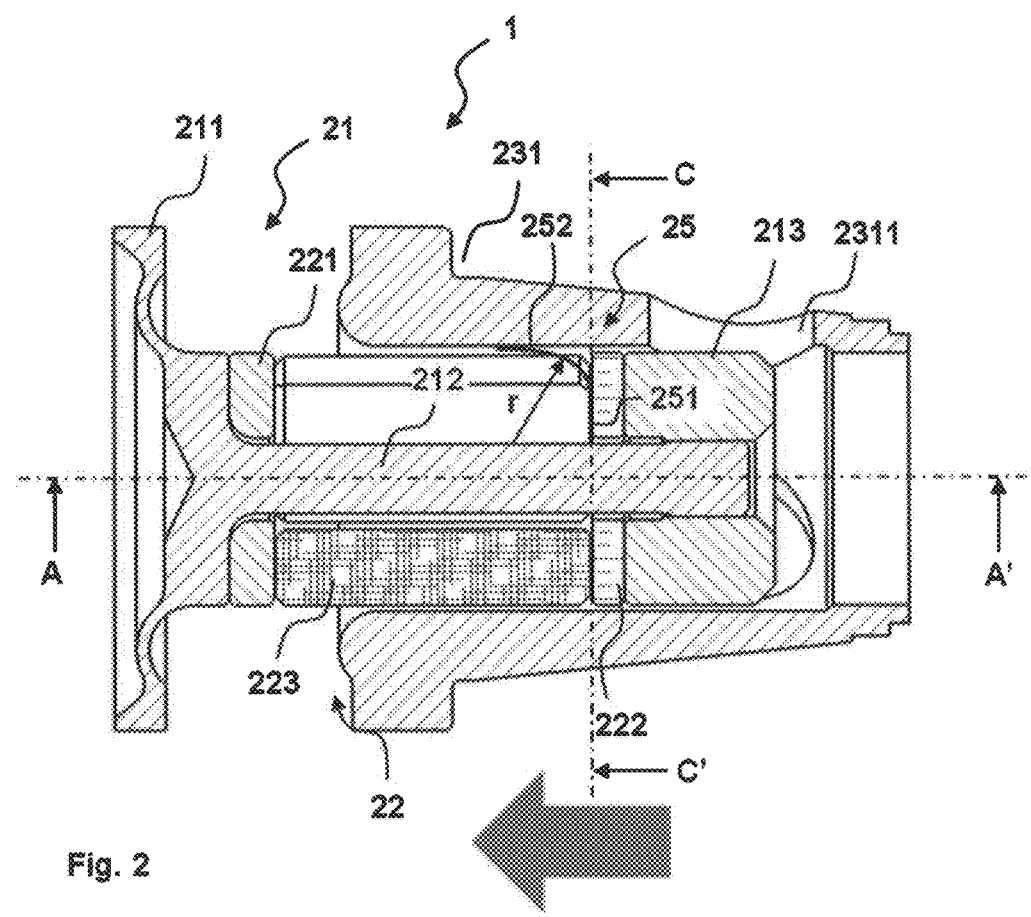
FIG. 2 shows a longitudinal section through a portion of the transducer arrangement of the pressure sensor according to FIG. 1 during mechanical connection to the membrane and anti-strain sleeve.
Figure 3:
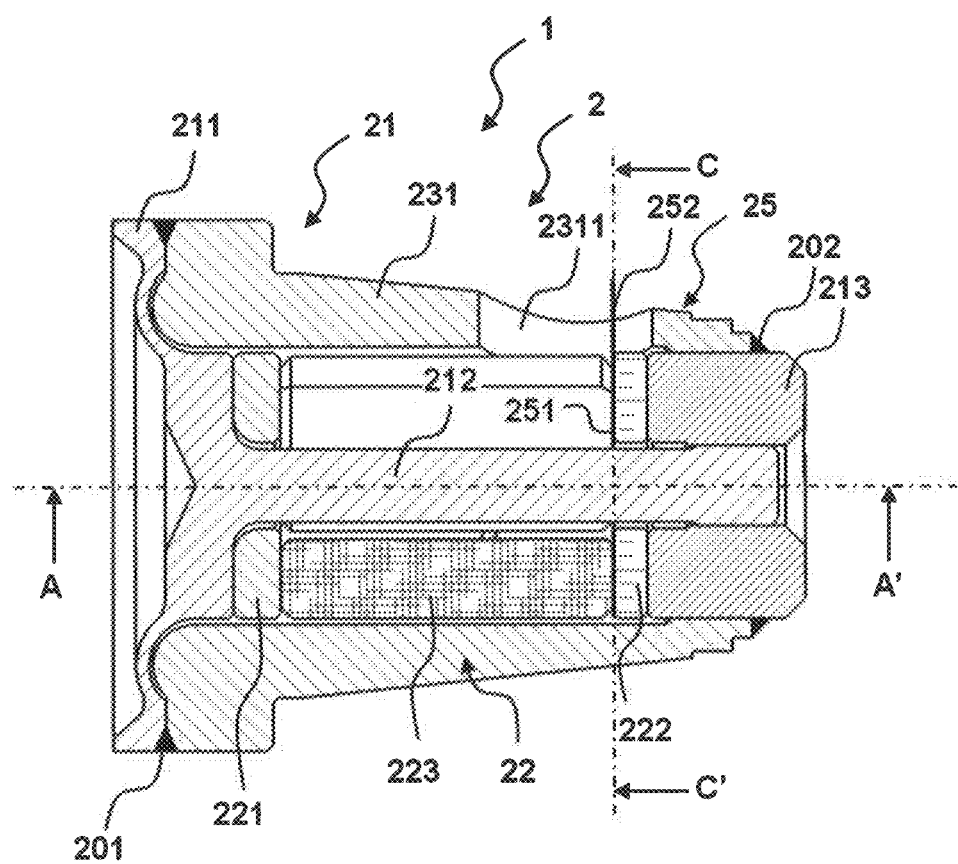
FIG. 3 shows a longitudinal section through a portion of the transducer arrangement of the pressure sensor according to FIG. 2 after mechanical connection to the membrane and anti-strain sleeve.

FIGS. 1 to 3 show sections through a portion of a transducer arrangement 2 along a longitudinal axis AA' of a pressure sensor 1. The transducer arrangement 2 comprises a membrane 21, which desirably is made of mechanically flexible material such as pure metals, nickel alloys, cobalt alloys, iron alloys, etc. Membrane 21 is shaped like a stamp having a membrane element 211 radially spaced apart from the longitudinal axis AA', a central pretensioning element 212 extending along the longitudinal axis AA', and a pretensioning body 213. The membrane element 211 is preferably formed integrally with the central pretensioning element 212. An end of the central pretensioning element 212 opposite of the membrane element 211 with respect to longitudinal axis AA' is mechanically connected to the pretensioning body 213, which desirably has the form of a cylinder. The mechanical connection between central pretensioning element 212 and pretensioning body 213 is achieved by material bonding such as welding, diffusion welding, thermo compression bonding, soldering, etc. Due to the mechanical connections, a piezoelectric transducer 22 is placed under a mechanical prestress in the order of magnitude of the measuring range of the pressure sensor 1 so that the components of the pressure sensor 1 are immovably held in their positions with respect to one another.

Transducer arrangement 2 comprises an anti-strain sleeve 231 in the form of a hollow cylinder. Anti-strain sleeve 231 prevents mechanical strains from an attachment of the pressure sensor 1 to be transferred to components within pressure sensor 1. Anti-strain sleeve 231 consists of mechanically flexible material such as pure metals, nickel alloys, cobalt alloys, iron alloys, etc.

Transducer arrangement 2 comprises a piezoelectric transducer 22. The piezoelectric transducer 22 is arranged between membrane element 211 and pretensioning body 213 with respect to the longitudinal axis AA'. Piezoelectric transducer 22 is supported by the central pretensioning element 212 of membrane 21. Piezoelectric transducer 22 comprises a compensation element 221, an electrically insulating ring 222, and at least one piezoelectric transducer element 223. With respect to the longitudinal axis AA', the piezoelectric transducer element 223 is disposed between the compensation element 221 and electrically insulating ring 222. Compensation element 221 serves for uniform distribution of a normal force captured by membrane 21 onto the piezoelectric transducer element 223. The normal force acts in the direction of longitudinal axis AA'. Compensation element 221 is cylindrical in shape and is made of electrically conductive and mechanically rigid material such as pure metals, nickel alloys, cobalt alloys, iron alloys, electrically conductive ceramics, ceramics having an electrically conductive coating, etc, Membrane 21 is in a flat mechanical contact to compensation element 221. Furthermore, the compensation element 221 and piezoelectric transducer element 223 are in a flat mechanical contact to each other. This flat mechanical contact between compensation element 221 and piezoelectric transducer element 223 may also be made through a mechanical connection. A mechanical connection of this type may be achieved by material bonding such as diffusion welding, thereto compression bonding, soldering, etc. However, knowing the present invention, those skilled in the art are also able to design the piezoelectric transducer without compensation element 221. Electrically insulating ring 222 has the form of a hollow cylinder and is made of electrically insulating and mechanically rigid material such as ceramics, $Al_2O_3$ ceramics, sapphire, etc. Electrically insulating ring 222 serves to electrically insulate an electrode 25 from the pretensioning body 213.

The piezoelectric transducer element 223 is cylindrical in shape and consists of piezoelectric material such as quartz ($SiO_2$ monocrystal), calcium gallo-germanate ($Ca_3Ga_2Ge_4O_{14}$ or CGG), langasite ($La_3Ga_5SiO_{14}$ or LGS), tourmaline, gallium orthophosphate, piezoceramics, etc. The crystallographic orientation in which piezoelectric transducer element 223 is cut is such that it has a high sensitivity for the force to be captured. Preferably, for the normal effect the material is cut in slices with an orientation that electric polarization charges are generated on those surfaces onto which the normal force acts. For obtaining the transverse effect the piezoelectric material is preferably cut into bars with an orientation that electric polarization charges are generated on those surfaces that are oriented in a direction transverse to the normal force.

In the embodiment of the invention shown, the piezoelectric material is cut into three piezoelectric transducer elements 223 in the form of bars to obtain the transverse effect. The piezoelectric transducer elements 223 are arranged in an angle of 120° to one another. The piezoelectric transducer elements 223 are equidistantly spaced apart from longitudinal axis AA'. The action of the normal force is via the front faces of the piezoelectric transducer elements 223 onto the piezoelectric material generating electric polarization charges on side surfaces of the piezoelectric transducer elements 223. For each piezoelectric transducer element 223 negative electric charges are generated on the side surface facing the longitudinal axis AA' and positive electric charges are generated on the side surface that faces away from longitudinal axis AA'.

The piezoelectric transducer elements 223 are metallized. Said metallizations are electrically conductive. For each piezoelectric transducer element 223, a first metallization extends from the side surface facing longitudinal axis AA' up to the front face 2231 facing away from membrane 21 and a second metallization extends from the side surface facing away from longitudinal axis AA' up to the front face that faces membrane 21. The first and second metallizations are electrically insulated from each other. For each piezoelectric transducer element 223, the first metallization transmits negative electric charges to the front face 2231 facing away from membrane 21 and the second metallization transmits positive electric charges to the front face facing membrane 21. However, knowing the present invention those skilled in the art are also able to invert this charge transmission and to transmit, for each piezoelectric transducer element 223, positive electric charges to the front face that faces away from the membrane and negative electric charges to the front face facing the membrane.

Furthermore, the skilled artisan can carry out the invention using piezoelectric crystal material cut into a disc-shaped piezoelectric transducer element for the normal effect. The normal force acting onto the piezoelectric material via front faces of the piezoelectric transducer element 223 generates electric polarization charges on said front faces. For example, negative electric charges are generated on the front face 2231 facing away from the membrane 21 while positive electric charges are generated on the front face facing the membrane.

Figure 5:
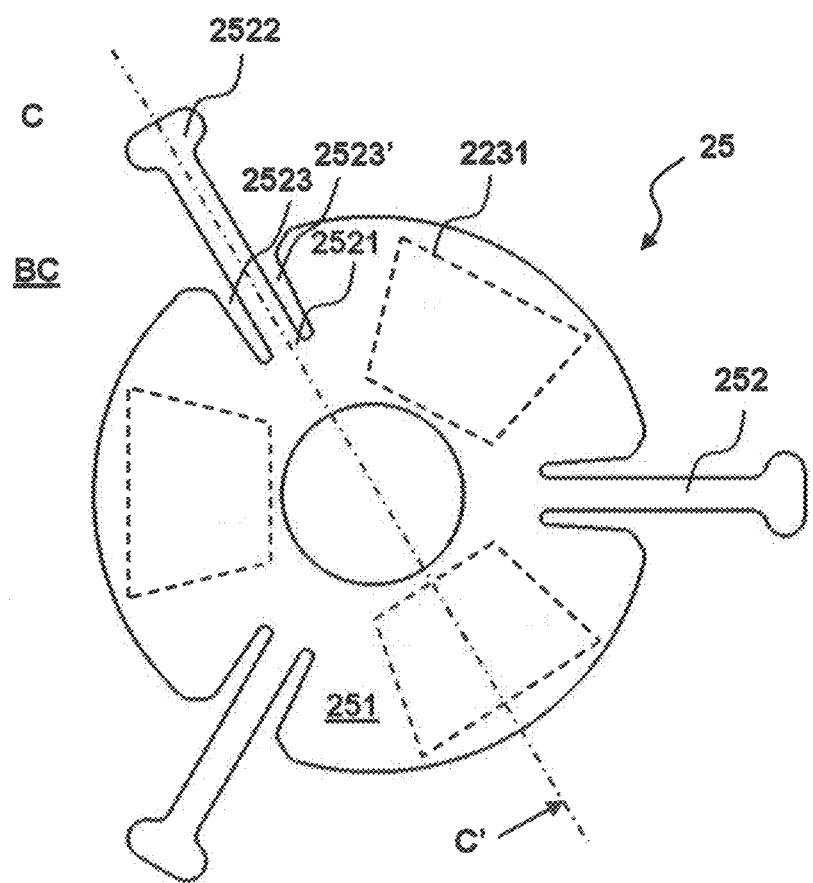
FIG. 5 shows a view of an electrode of the transducer arrangement according to any of FIGS. 1 to 4.

Transducer arrangement 2 comprises an electrode 25 that is made of electrically conductive material such as pure metals, nickel alloys, cobalt alloys, iron alloys, etc. Electrode 25 is foil-like in design and has a thickness of less than or equal to 200 µm, preferably less than or equal to 20 µm. FIG. 5 shows a view of electrode 25. Electrode 25 is essentially positioned in an electrode plane BC and comprises a charge pick-off 251 in the form of a hollow cylinder and at least one elongated electrode strip 252. Electrode plane BC runs in an angle to longitudinal axis AA' and parallel to the front faces 2231 of the piezoelectric transducer elements 223 that face away from membrane 21. Due to the small axial thickness of electrode 25, the electrode material will additionally exhibit a small change in length along longitudinal axis AA under the action of the normal force (Hooke's law). This small change in length minimizes the contribution of the electrode material to errors during force measurement. To illustrate this fact, the three front faces 2231 of the three piezoelectric transducer elements 223 are shown dashed in FIG. 5. Preferably, charge pick-off 251 completely covers the front faces 2231. Preferably, three electrode strips 252 are arranged in angle of 120° to one another. Three electrode strips 252 enable redundant charge transmission. This is advantageous because in case of a failure of one electrode strip 252 or of two electrode strips 252, for example due to breakage, tearing, etc., there is at least one remaining electrode strip 252 to ensure charge transmission. Electrode 25 is mirror-symmetric with respect to a symmetry axis CC' of electrode 25. Said symmetry axis CC' lies within electrode plane BC. Charge pick-off 251 is arranged in the center. A diameter of a central opening of charge pick-off 251 is larger than an outer diameter of the central pretensioning element 212 so that the electrode 25 can be disposed around the central pretensioning element 212 without making a mechanical or electrical contact to central pretensioning element 212.

Electrode strip 252 extends radially away from the charge pick-off. Electrode strip 252 comprises two ends 2521, 2522. At an inner end 2521, electrode strip 252 is integral with the charge pick-off 251. At an outer end 2522, electrode strip 252 comprises a contact surface. Preferably, the inner ends 2521 of three electrode strips 252 are disposed in the same radial distance from the central opening. Preferably, the inner ends 2521 of the three electrode strips 252 are positioned in a radial distance essentially concentrically between the diameter of the central opening and an outer diameter of the charge pick-off 251.

Electrode strip 252 is preferably spaced apart from charge pick-off 251 by two grooves 2523, 2523' in certain areas. Grooves 2523, 2523' extend from the inner end 2521 of electrode strip 252 to the outer diameter of charge pick-off 251. Electrode strip 252 can be deflected out of electrode plane BC with respect to the charge pick-off 251. The deflection is reversible. During deflection, the material of electrode 25 is elastically deformed while a plastic deformation of the electrode 25 material is avoided. By means of parameters such as thickness of the electrode 25, length of the electrode strip 252, length of grooves 2523, 2523', etc., a permissive range of deflection is adjusted wherein in said range of deflection no plastic deformation of the electrode 25 material occurs. A deflection within the permissive range is defined by a bending radius r of the electrode strip 252. However, being aware of the present invention those skilled in the art will also be able to construct the electrode 25 with a different number of electrode strips 252.

Figure 4:
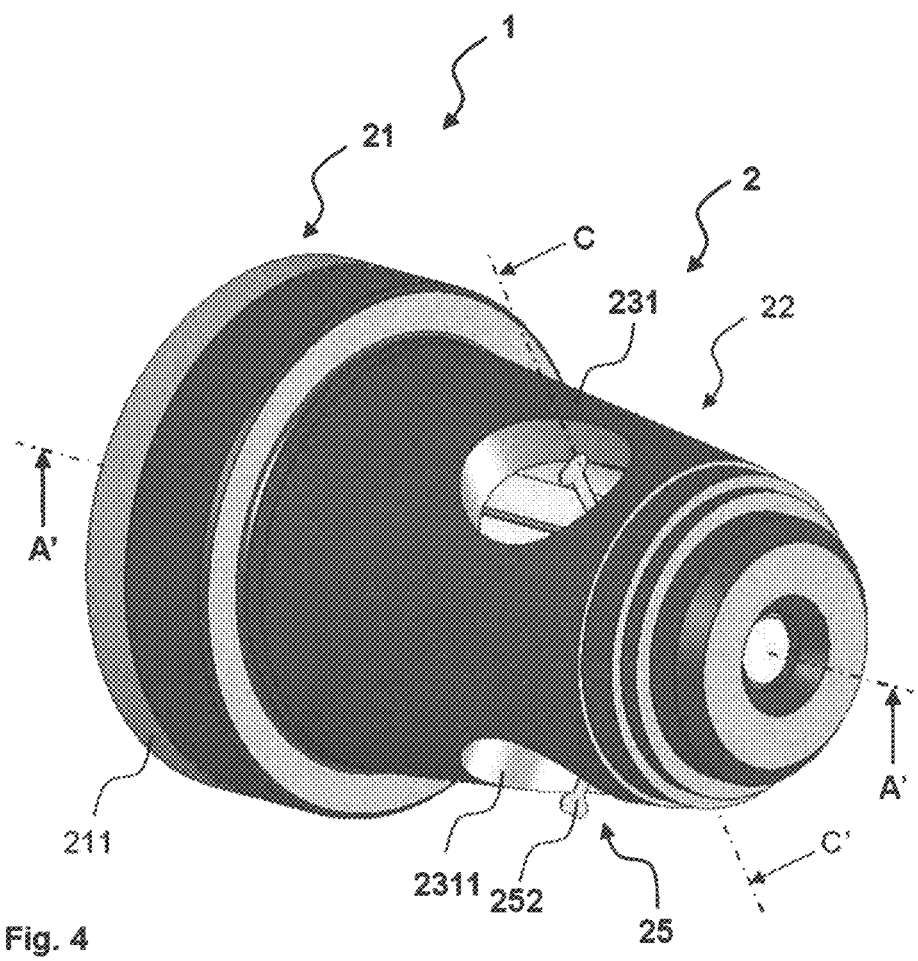
FIG. 4 shows a perspective view of the transducer arrangement of the pressure sensor according to FIG. 3.

FIGS. 1 to 3 show steps of a process of mechanically connecting membrane 21 to anti-strain sleeve 231. As schematically shown by an arrow in FIGS. 1 and 2, the anti-strain sleeve 231 is positioned by sliding it on top of membrane 21 along the longitudinal axis AA'. In FIG. 1, membrane 21 and anti-strain sleeve 231 are at a distance to one another. The at least one electrode strip 252 is positioned within electrode plane BC being at an angle to the longitudinal axis AA'. In FIG. 2, anti-strain sleeve 231 is partly positioned on top of membrane 21 while electrode strip 252 is deflected by a wall of the anti-strain sleeve 231 against the piezoelectric transducer element 223 so that the electrode strip 252 is partly positioned parallel to the longitudinal axis AA'. The bending radius r has the form of a parabola. An amount of the bending radius r essentially corresponds to a longitudinal extension of the front face 2231 of the piezoelectric transducer elements 223 along the axis of symmetry CC'. In FIG. 3, anti-strain sleeve 231 is completely positioned on top of membrane 21. Electrode strip 252 is no longer deflected by the wall of anti-strain sleeve 231. As shown in the perspective view according to FIG. 4, electrode strip 252 protrudes through an electrode opening 2311 of the anti-strain sleeve 231. Electrode strip 252 has essentially returned into electrode plane BC. Thus, the contact surface of electrode strip 252 is accessible from outside the anti-strain sleeve 231 and therefore also from outside the transducer arrangement 2.

Membrane element 211 is mechanically connected to a first end of the anti-strain sleeve 231. The pretensioning body 213 is mechanically connected to a second end of the anti-strain sleeve 231. The mechanical connections between membrane element 211 and anti-strain sleeve 231 as well as between pretensioning body 213 and anti-strain sleeve 231 are preferably achieved by material bonding such as welding, diffusion welding, thereto compression bonding, soldering, etc. In FIG. 3, a first transducer arrangement connection 201 of membrane element 211 to the first end of anti-strain sleeve 231 is drawn, and in FIG. 3 a second transducer arrangement connection 202 of pretensioning body 213 to the second end of anti-strain sleeve 231 is represented. The transducer arrangement prepared in this way is an assembly.

Figure 6:
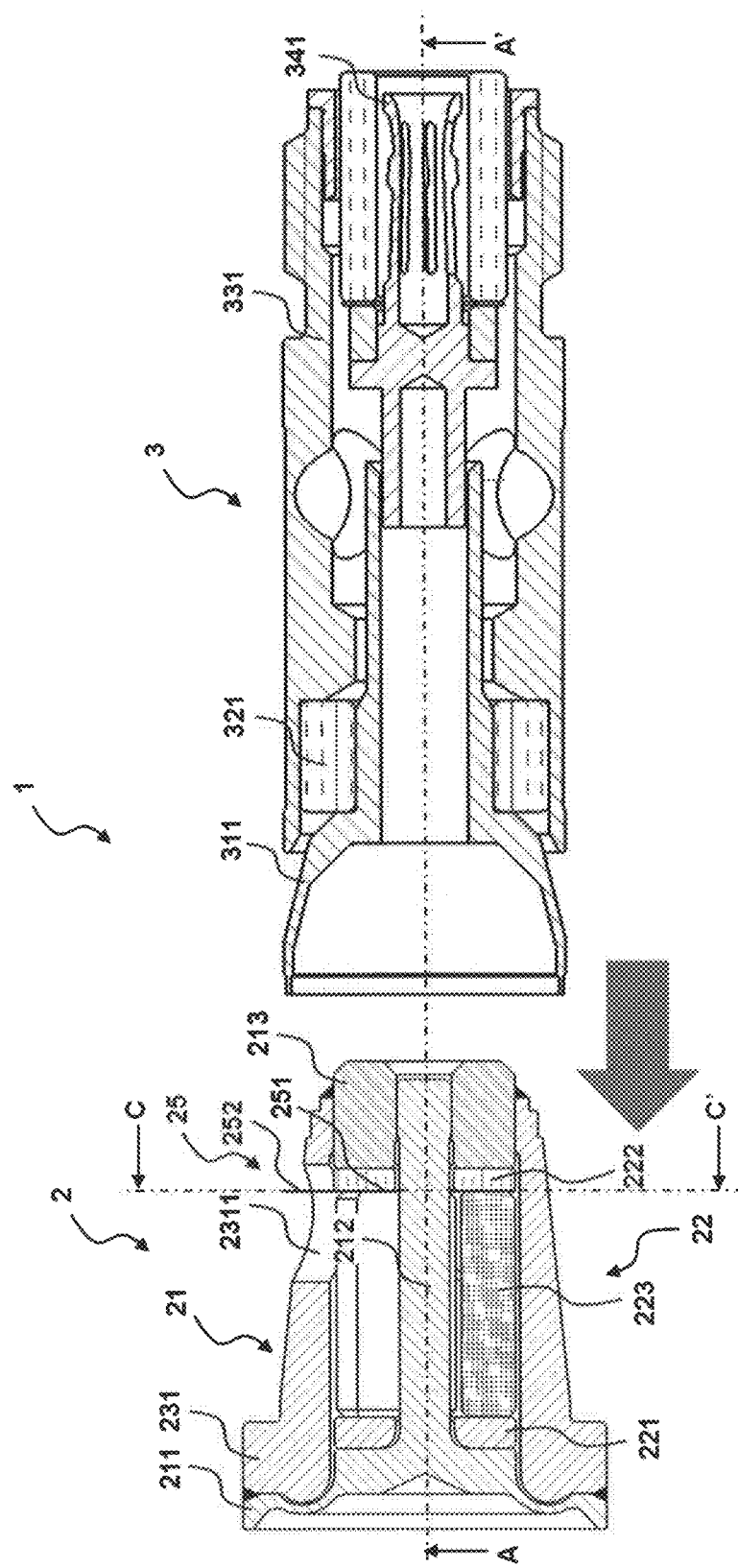
FIG. 6 shows a longitudinal section through a portion of the pressure sensor prior to material bonding of an electrode of the transducer arrangement according to FIG. 3 or 4 to a charge transmission of a transmission arrangement.
Figure 7:
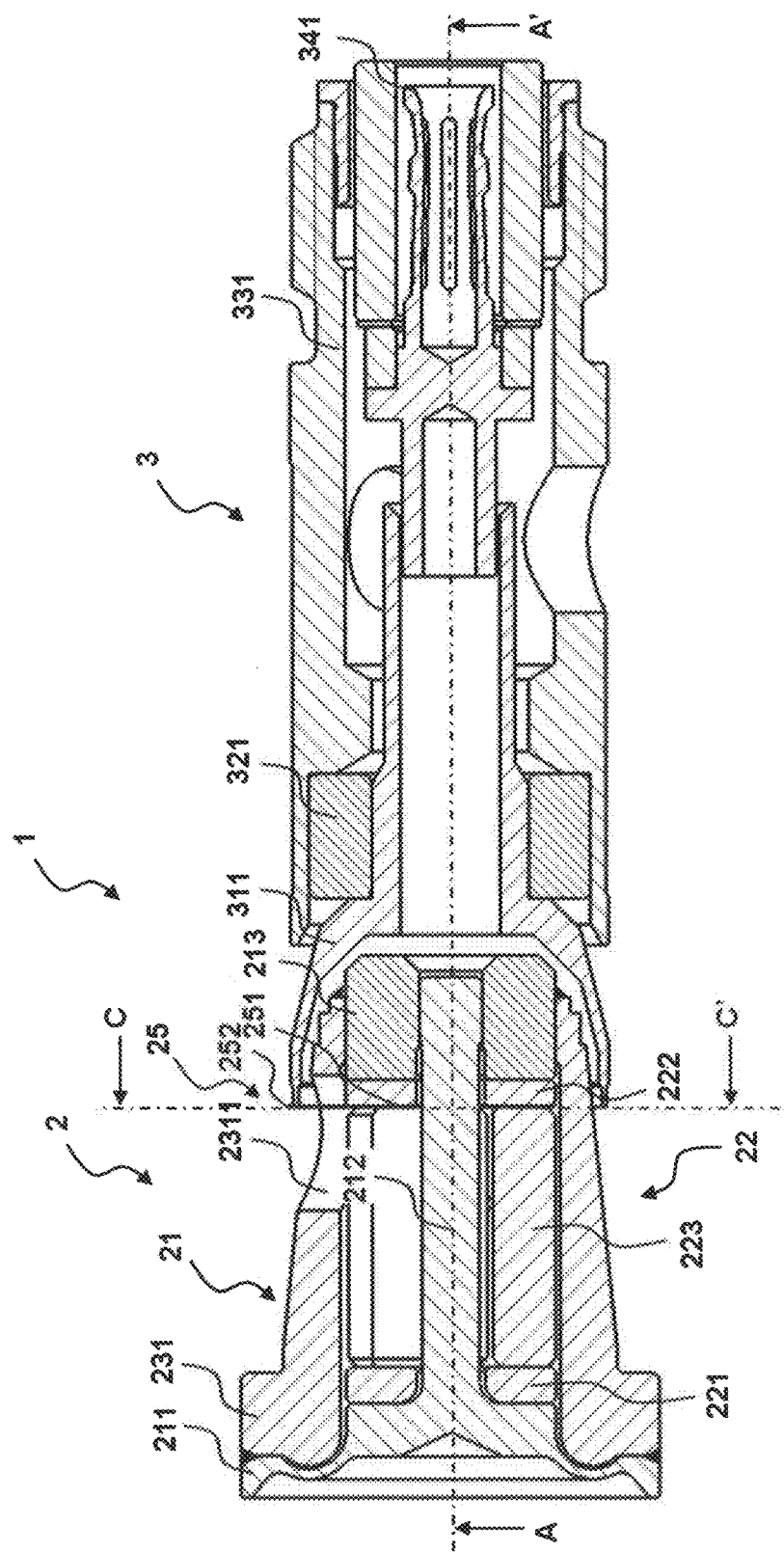
FIG. 7 shows a longitudinal section through a portion of the pressure sensor according to FIG. 6 after the material bond of the electrode of the transducer arrangement to the charge transmission of a transmission arrangement was made.

FIGS. 6 and 7 show steps of a process of forming a material bond between electrode 25 and a charge transmission 311 of a transmission arrangement 3 of pressure sensor 1. The transmission arrangement 3 also is an assembly. Transmission arrangement 3 comprises the charge transmission 311, an electric plug connection 341 and a transmission body 331. Charge transmission 311 and electric plug connection 341 are accommodated within the transmission body 331. Transmission body 331 keeps the components of the transmission arrangement 3 immovably in their positions to one another. Transmission body 331 is formed as a hollow cylinder and is made of mechanically resistant material such as pure metals, nickel alloys, cobalt alloys, iron alloys, etc. Charge transmission 311 is electrically insulated from transmission body 331 by an electrically insulating element 321. The electrically insulating element 321 has a cylindrical shape and is made of electrically insulating and mechanically rigid material such as ceramics, $Al_2O_3$ ceramics, sapphire, etc.

Charge transmission 311 has the shape of a hollow cylinder and is made of electrically conductive material such as pure metals, nickel alloys, cobalt alloys, iron alloys, etc. Charge transmission 311 transmits the electric polarization charges received from electrode 25 to electric plug connection 341. Charge transmission 311 and electric plug connection 341 are electrically and mechanically connected to each other. Preferably, charge transmission 311 and electric plug connection 341 are connected to each other in certain areas by material bonding such as welding, diffusion welding, thermo compression bonding, soldering, etc. In FIGS. 6 and 7, the transmission body 331 comprises at least one opening through which a joining tool can access the connecting region and form the material bond.

Figure 9:
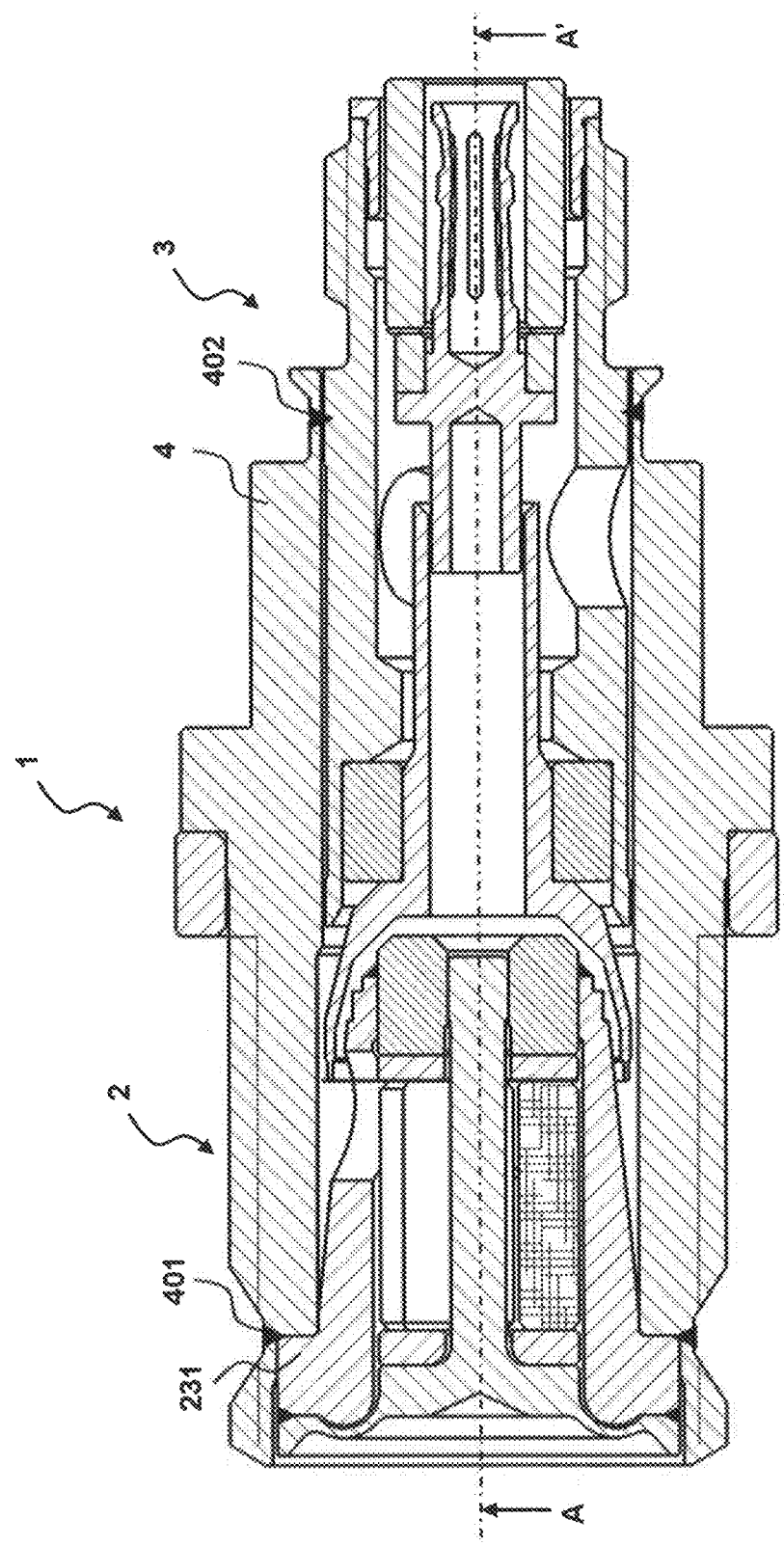
FIG. 9 shows a longitudinal section through a portion of the pressure sensor according to FIG. 7 after the mechanical connection between the transducer arrangement and the transmission arrangement to the body according to FIG. 8 was made.

In FIGS. 6, 7, and 9, only a female part of the electric plug connection 341 is shown. The female part of the electric plug connection 341 is designed as a socket. The socket can be connected to a male part with a matching shape of the electric plug connection or plug in a form-fitting and electrically conductive manner. Electric polarization charges are transmitted via the electric plug connection to an evaluation unit. The plug, line and evaluation unit are not shown in the Figures. Within the evaluation unit, the electric polarization charges are electrically amplified and evaluated. Those skilled in the art being aware of the present invention can also design the electric plug connection as a built-in plug instead of a socket that may be connected to a coupling with matching shape in a form-fitting and electrically conductive manner for the transmission of electric polarization charges to an evaluation unit.

Transducer arrangement 2 and transmission arrangement 3 are assemblies. This is advantageous in that variations of transducer arrangement 2 can be formed with variations of transmission arrangement 3 to build a pressure sensor 1, increasing a number of equal parts and making fabrication cost-effective. Variations of the transducer arrangement 2 comprise membranes 21 with different membrane thicknesses, piezoelectric transducer elements 223 functioning according to the transverse effect or the normal effect, piezoelectric transducers 22 with different sensitivities, piezoelectric transducers 22 for different temperature ranges of use, etc. Variations of the transmission arrangement 3 comprise different types of electric plug connection 341, electric plug connections 341 with lines of various lengths, etc.

In FIG. 6, transmission arrangement 3 and transducer arrangement 2 are positioned at a distance to one another. As schematically indicated by an arrow, transmission arrangement 3 and transducer arrangement 2 are disposed at particular positions with respect to each other. Preferably, this positioning is achieved by moving transmission arrangement 3 towards transducer arrangement 2. In FIG. 7, the transmission arrangement 3 is positioned with respect to the transducer arrangement 2 in a way that the charge transmission 311 mechanically contacts at least one electrode strip 252 protruding from electrode opening 2311. As long as the electrode strip 252 is not material-bonded to charge transmission 311, electrode strip 252 can be reversibly deflected out of the electrode plane BC. After the electrode strip 252 is material-bonded to the charge transmission 311, the electrode strip 252 can no longer be reversibly deflected out of the electrode plane BC. In the contact position, charge transmission 311 is connected to the electrode strip 252 by material bonding in certain areas. The material bond is made by means of welding, diffusion welding, thermo compression bonding, soldering, etc. Charge transmission 311 and electrode strip 252 are preferably mechanically fixed in this contact position and using a joining tool the contact surface of electrode strip 252 is pressed against and welded to a membrane-facing end of the charge transmission 311.

Preferably, electrode strip 252 is connected to the charge transmission 311 essentially free of mechanical stresses. Thus, electrode strip 252 is arranged in the electrode opening 2311 essentially free of mechanical stresses. Accordingly, due to the small axial thickness of electrode 25 and the positioning of the electrode strip 252 essentially free of mechanical stresses, a force shunt by which part of the normal force may be transmitted via electrode 25 into the charge transmission 311 is also small. The small force shunt minimizes the contribution of charge transmission to the error of a force measurement. Furthermore, because the connection of electrode strip 252 to charge transmission 311 is made by material bonding and is free of stresses, a coupling of the thermal expansions is achieved. In particular at high temperatures, the materials of the transducer arrangement 2, transmission arrangement 3 and body 4 may exhibit different expansions while this expansion cannot act as interfering mechanical stresses onto the piezielectric transducer element 223 thus achieving a decoupling of the piezielectric transducer element 223. For example, at high temperatures a length of the transducer arrangement 2 along the longitudinal axis AA' changes relative to a length of the transmission arrangement 3 by a small expansion of 0.05 mm. According to FIG. 7, in this case an end of the transducer arrangement 2 that faces away from membrane 21 will be 0.05 mm closer to an end of the transmission arrangement 3 that faces membrane 21. Although electrode strip 252 extends at a right angle with respect to longitudinal axis AA' from the charge transmission 311 to the charge pick-off 251 at room temperature, charge pick-off 251 is displaced by the relative change in length of 0.05 mm with respect to transmission arrangement 3 at high temperatures and, consequently, the electrode strip 252 extends at an angle different from a right angle with respect to the longitudinal axis AA' from the charge transmission 311 to the charge pick-off 251.

Figure 8:
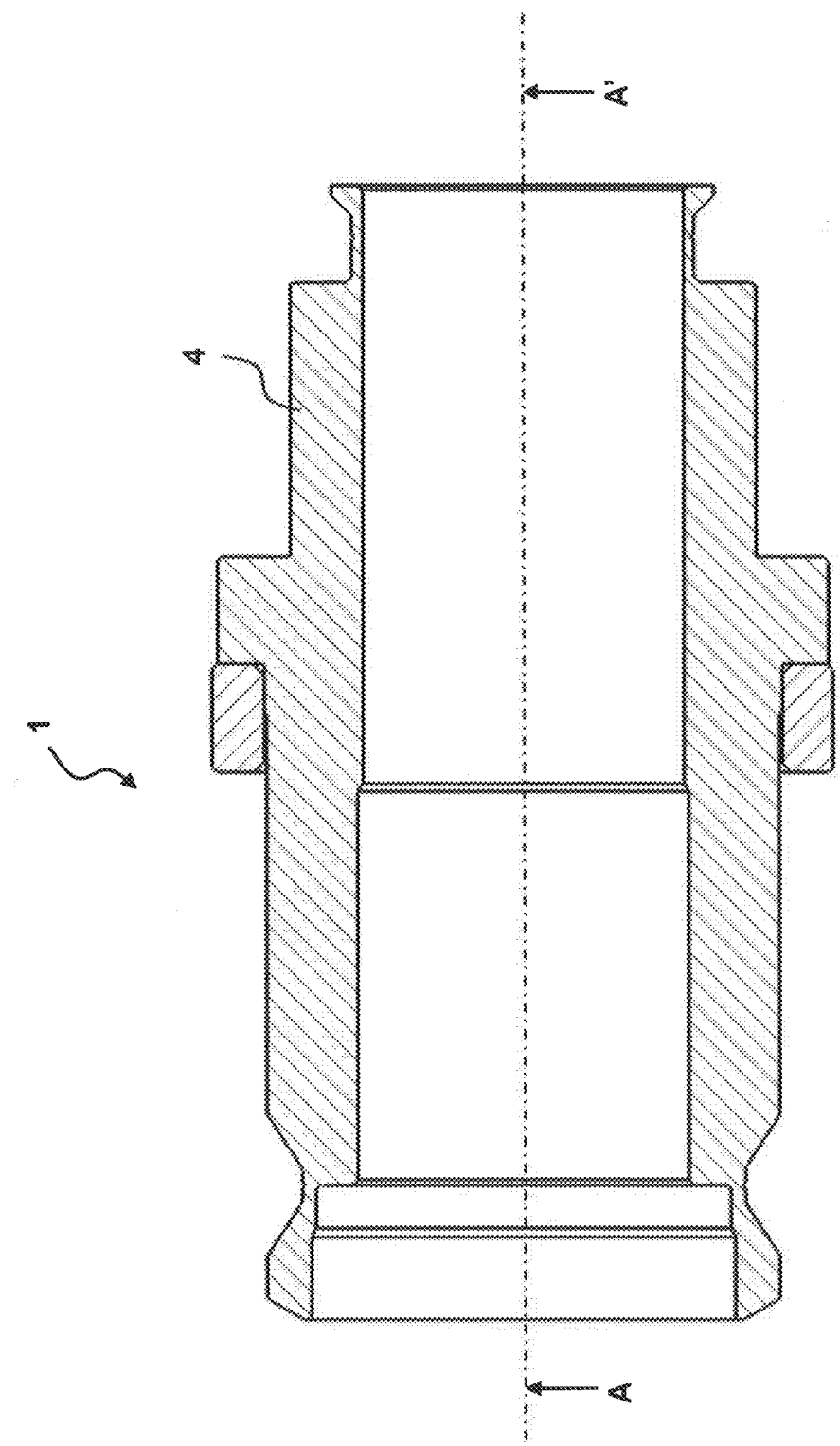
FIG. 8 shows a longitudinal section through a portion of a body of the pressure sensor.

FIG. 8 shows a body 4 of the pressure sensor 1. Body 4 protects the components of the pressure and force sensor 1 from shocks, impacts, dust, humidity, etc., that are encountered during use. Body 4 is in the form of a hollow cylinder and is made of mechanically resistant material such as pure metals, nickel alloys, cobalt alloys, iron alloys, etc. An inner diameter of body 4 is larger than or equal to an outer diameter of transmission arrangement 3 so that the body is slidable along the longitudinal axis AA' to be positioned on top of transmission arrangement 3.

As shown in FIG. 9, body 4 is positioned along longitudinal axis AA' over the transmission arrangement 3 until a first end of body 4 mechanically contacts a projection of anti-strain sleeve 231 of the transducer arrangement 2. In this contact position, transducer arrangement 2 and body 4 as well as transmission arrangement 3 and body 4 are connected to one another in certain areas by material bonding such as by welding, diffusion welding, thereto compression bonding, soldering, etc. FIG. 9 shows a first body connection 401 of the anti-strain sleeve 231 to the first end of the body 4 while FIG. 9 represents a second body connection 401 of the transmission body 331 to a second end of body 4, In the contact position, the transmission arrangement 3 and transducer arrangement 2 are arranged within body 4 so that the material bond between electrode strip 252 and charge transmission 311 forms the only direct mechanical and electrical connection between transmission arrangement 3 and transducer arrangement 2.

LIST OF REFERENCE NUMERALS

AA' longitudinal axis
BC electrode plane
CC' axis of symmetry
r bending radius
1 pressure sensor
2 transducer arrangement
3 transmission arrangement
4 body
21 membrane
201, 202 transducer arrangement connection
211 membrane element
212 central pretensioning element
213 pretensioning body
22 piezoelectric transducer
221 compensation element
222 electrically insulating ring
223 piezoelectric transducer element
2231 front face
231 anti-strain sleeve
2311 electrode opening
25 electrode
251 charge pick-off
252 electrode strip
2512 inner end
2522 outer end
2523, 2523' groove
311 charge transmission
321 electrically insulating element
331 transmission body
341 electric plug connection
401, 402 body connection

The invention claimed is:

1. A piezoelectric pressure sensor, comprising:
a membrane for capturing a force;
a piezoelectric transducer defining a front face disposed relative to the membrane so that the captured force generates electric polarization charges onto the front face;
a charge transmission;
an electrode that includes at least one electrode strip connected to the charge transmission by means of material bonding in certain areas of the at least one electrode strip, the electrode further including a charge pick-off arranged parallel to the front face of the piezoelectric transducer and that receives and transmits the received generated electric polarization charges via the charge transmission; and
an anti-strain sleeve receiving said electrode and defining at least one electrode opening, wherein the electrode strip protrudes through the at least one electrode opening of the anti-strain sleeve.

2. The piezoelectric pressure sensor according to claim 1 wherein the charge pick-off and the electrode strip are essentially disposed in an electrode plane.

3. The piezoelectric pressure sensor according to claim 1, wherein the electrode is foil-like in design and that the electrode has a thickness of less than or equal to 200 μm.

4. The piezoelectric pressure sensor according to claim 1, wherein the electrode strip is connected to the charge pick-off essentially free of mechanical stresses.

5. The piezoelectric pressure sensor according to claim 1, wherein the electrode strip comprises a contact surface at its outer end; and that the contact surface of the electrode strip is accessible from outside the anti-strain sleeve.

6. The piezoelectric pressure sensor according to claim 1, wherein a plurality of electrode strips are connected to the charge pick-off by material bonding for redundantly transmitting electric polarization charges to the charge pick-off.

7. The piezoelectric pressure sensor according to claim 1, wherein the electrode is foil-like in design and has a thickness of less than or equal to 20 μm.

* * * * *